United States Patent [19]

Ogita et al.

[11] 4,037,057
[45] July 19, 1977

[54] NOISE-CANCELLING APPARATUS FOR FM STEREO RECEIVER

[75] Inventors: Minoru Ogita; Juro Hoshi, both of Hamamatsu, Japan

[73] Assignee: Nippon Gakki Seizo Kabushiki Kaisha, Hamamatsu, Japan

[21] Appl. No.: 599,351

[22] Filed: July 28, 1975

[30] Foreign Application Priority Data

| Aug. 1, 1974 | Japan | 49-92146[U] |
| Oct. 24, 1974 | Japan | 49-127846[U] |
| Oct. 25, 1974 | Japan | 49-123115 |

[51] Int. Cl.$^2$ .............................................. H04H 5/00
[52] U.S. Cl. ................................................ 179/15 BT
[58] Field of Search ............. 179/15 BT; 325/36, 348, 325/409

[56] References Cited

U.S. PATENT DOCUMENTS

| 3,526,720 | 9/1970 | Gourley | 179/15 BT |
| 3,584,154 | 6/1971 | McShan | 179/15 BT |
| 3,673,342 | 7/1972 | Muller | 179/15 BT |
| 3,752,934 | 8/1973 | Nakamura et al. | 179/15 BT |
| 3,790,714 | 2/1974 | Ohsawa | 179/15 BT |
| 3,823,268 | 7/1974 | Modafferi | 179/15 BT |
| 3,825,697 | 7/1974 | Cornell et al. | 179/15 BT |

*Primary Examiner*—Douglas W. Olms
*Attorney, Agent, or Firm*—Cushman, Darby & Cushman

[57] ABSTRACT

A noise-cancelling apparatus for use in an FM stereo receiver. This apparatus blends the signals of the left and the right channels of the receiver with each other substantially evenly throughout the entire audio frequency range of such signals so that noise components are cancelled with each other and S/N ratio is improved. This blending is accomplished either by connecting the output terminal of the left channel to the output terminal of the right channel by a common resistor, or by causing a decay, through a filter, of those frequency components higher than the pilot signal frequency among the input signals of the multiplex demodulator provided in the FM stereo receiver.

1 Claim, 13 Drawing Figures

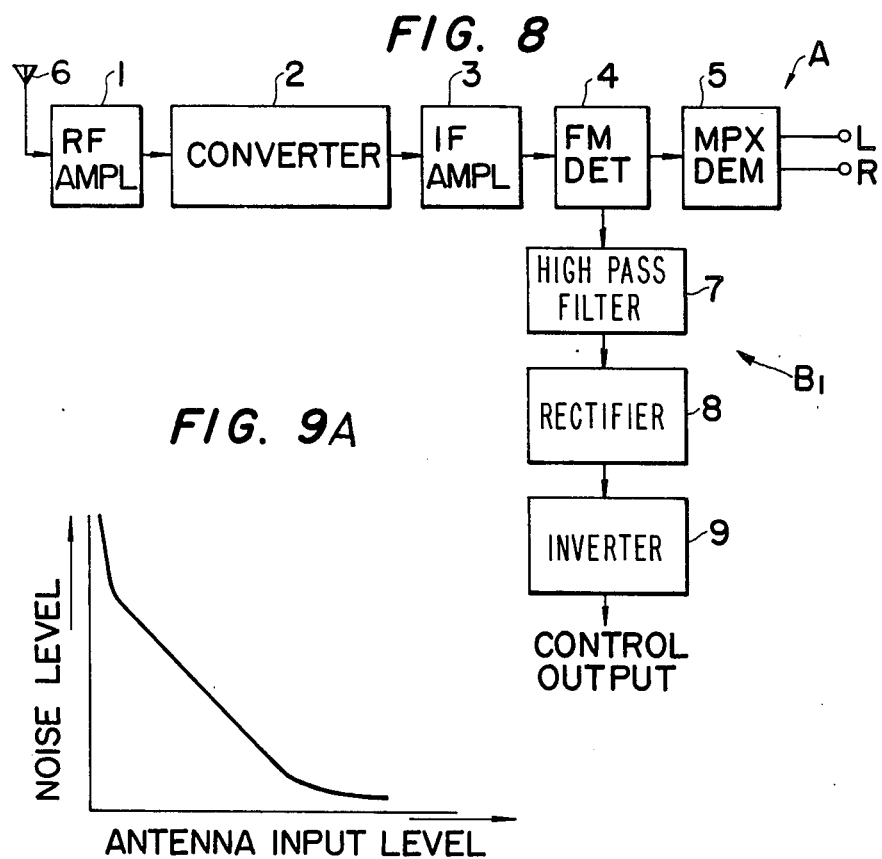
FIG. 8
FIG. 9A
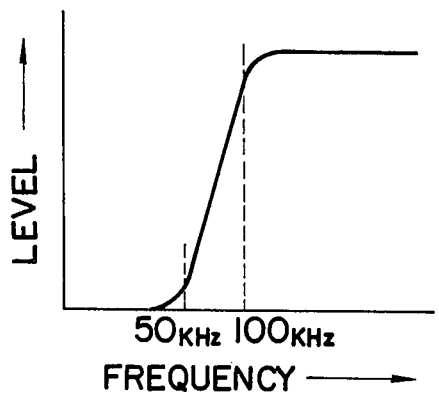
FIG. 9B
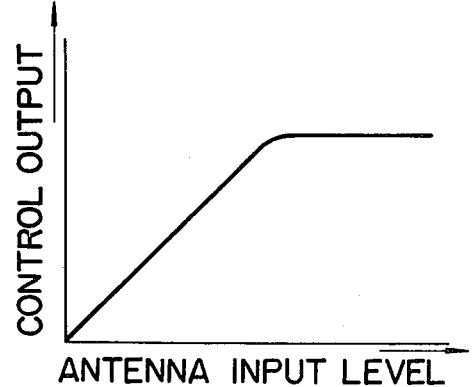
FIG. 9C

NOISE-CANCELLING APPARATUS FOR FM STEREO RECEIVER

BACKGROUND OF THE INVENTION a. Field of the Invention

The present invention relates to a noise-cancelling apparatus in an FM stereo receiver, and more particularly it pertains to a noise-cancelling apparatus used in an FM stereo receiver, which is arranged to be operative so that, whenever the level of the signal received drops below a predetermined level, the signal of the left channel is adapted to be blended with a certain volume of the signal of the right channel substantially evenly substantially throughout the entire range of audio frequency on the part of the signal receiver and vice versa at the same time, so that the signal to noise ratio, S/N ratio, is improved.

b. Brief Description of the Prior Art

It is known that FM broadcast is not comparable to AM broadcast in that the signal to noise ratio, S/N ratio, of the former is much superior to that of the latter. However, the FM stereo broadcast is susceptible to being affected by noise components as compared with FM monoral broadcast. For this reason, in case FM stereo signals are received by an FM stereo receiver, the noise components in the high frequency range will tend to increase if the level of signals received drops to a low value, causing the S/N ratio to aggravate.

In order to prevent aggravation of the S/N ratio, there has been proposed in the past an FM stereo receiver which is arranged so that a high-cut filter (a filter designed to eliminate frequencies above a particular level) is adapted to be connected to or disconnected from the signal line by a switching means. Such an FM stereo receiver, however, is designed so as to cut not only the noise components in the high frequency range but also the signals received as well over the band of 3 to 10 kHz. Accordingly, the known FM stereo receiver has the drawback that the quality of the program source is deteriorated.

Also, as a means for improving the aforesaid S/N ratio, there is known a noise-cancelling apparatus for use in an FM stereo receiver, which is arranged so that the high frequency range components in the signals of the right and left channels are blended with each other via a capacitor. In this known noise-cancelling apparatus, however, the amount of signals of the right and the left channels which are blended with each other will increase greater for a higher frequency range. Thus, there arises the unavoidable tendency that the separation of channels becomes poorer for higher frequency range, and that the localization of sound image will fluctuate depending on the frequency of the signal received, giving a sense of loss of naturalness to the listener. Furthermore, in this known noise-cancelling apparatus, the inverted phase components in the signals of the right and the left channels will be cancelled with each other more intensively for higher frequency range. Thus, there is the drawback that the frequency characteristics will be heard as decaying greater for a higher frequency range.

Moreover, the aforesaid high-cut filter and the noise-cancelling apparatus of the known art are usually arranged so that such device is adapted to be automatically connected to and disconnected from an FM stereo receiver by a switching means which is capable of being actuated in accordance with the level of the signals received by the FM stereo receiver. Thus, there is the need for the provision of means for obtaining a control signal for controlling said switching means. With the conventional means for obtaining said control signal, there has been the inconvenience that in case there is a divergence in the gain of a radio-frequency amplifier or an intermediate frequency amplifier due to manufacturing error, there will arise a discrepancy in the level of the control signal obtained relative to the signal received of the same level. Thus, it has been necessary to adjust the levels of the control signal for the respective FM stereo receivers manufactured. This adjusting operation requires a great deal of labor, thus constituting a cause for an increase in the manufacturing cost.

SUMMARY OF THE INVENTION

It is, therefore, a primary object of the present invention to provide a noise-cancelling apparatus for use in an FM receiver, which features that the separation of the channels is substantially constant throughout the entire range of audio frequency of the signals received and that, accordingly, which enables the user to obtain a stable localization of sound image.

Another object of the present invention is to provide a noise-cancelling apparatus of the type described, which does not give any ill effect on the frequency characteristics of an FM stereo receiver.

Still another object of the present invention is to provide a noise-cancelling apparatus of the type described above, which is arranged so that, whenever the level of the signals received by the FM stereo receiver drops below a predetermined level, the noise-cancelling apparatus will become actuated automatically.

A further object of the present invention is to provide a noise-cancelling apparatus of the type described above, which does not require any adjustment.

These and other objects as well as the features of the present invention will become apparent by reading the following detailed description of the invention when taken in conjunction with the accompanying drawings.

BRIEF DESCRIPTION OF THE DRAWINGS

FIG. 8 is a block diagram showing an example of the received signal level detector employed in the noisecancelling apparatus.

FIGS. 9A to 9C are charts for explaining the action of the received signal level detector shown in FIG. 8, in which:

FIG. 9A is a chart showing the relationship between the noise signal level among the output of the FM detector and the received signal level;

FIG. 9B is a chart showing the frequency characteristic of the high-pass filter; and FIG. 9C is a chart showing the relationship between the control signal level and the received signal level.

Like parts are indicated by like reference symbols and numerals throughout the drawings.

DETAILED DESCRIPTION OF THE PREFERRED EMBODIMENTS

The noise-cancelling apparatus of the present invention is arranged so that, whenever the signal receiving condition plunges into a state that the level of the signal received by an FM stereo receiver drops below a predetermined level and that accordingly the S/N ratio becomes aggravated, the signals of the right and the left channels are blended with each other almost evenly substantially throughout the entire range of audio frequency. The blending of signals of the right and the left channels is attained either by (a) connecting the right and the left output terminals of the multiplex demodulator of the FM stereo receiver to each other by an element, such as a resistor, having a substantially constant impedance throughout the entire range of audio frequency, or by (b) removing the whole or a part of those components exceeding at least the pilot signal frequency from among the input signals of the multiplex demodulator.

Also, the detector for detecting the level of the signal received which is provided in case it is intended to automatize the action of the noise-cancelling apparatus of the present invention is arranged so that it will detect the control signal based on that level of the noise component existing among the output of the FM detector which is associated only with the level of the signal received by the FM stereo receiver.

The present invention will hereunder be described in further detail on some examples.

Figure 1:
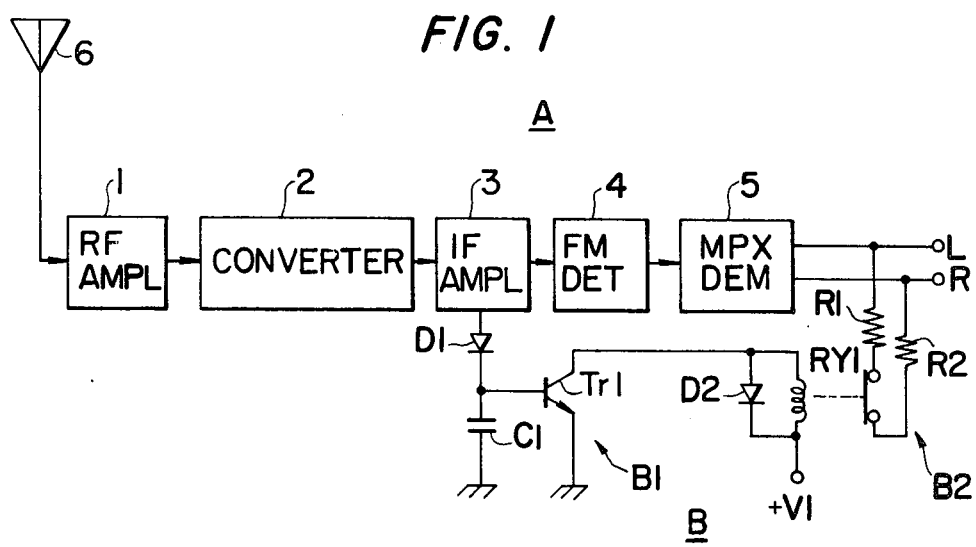
FIG. 1 is a block diagram showing an example of the noise-cancelling apparatus according to the present invention.

In FIG. 1, symbol A generally indicates an FM stereo receiver. Usually, this FM stereo receiver A comprises a radio-frequency amplifier circuit 1, a frequency converter circuit 2, an intermediate-frequency amplifier circuit 3, an FM detector 4 and a multiplex demodulator 5. Numeral 6 represents a signal-receiving antenna. Symbols L and R represent output terminals of signals of the left and the right channels.

Symbol B represents generally a noise-cancelling apparatus according to the present invention. This noise-cancelling apparatus B is comprised of a received signal level detector B1 which is adapted to generate a control signal in case the level of the signal received by the stereo receiver A drops below a predetermined level, and a blender B2 for blending the signals of the right and the left channels. The received signal level detector B1 is comprised of: a diode D1 having its one end connected to a signal line in which the signal level varies depending on the level of the signal received by the FM stereo receiver, for example the automatic gain control line or the intermediate frequency signal line of the intermediate frequency amplifier circuit 3; a transistor Tr1 having its base circuit connected to the other terminal of said diode D1; and a capacitor C1 connected between said base electrode and the ground.

The blender B2 is composed of: a relay RY1 connected in series between the collector circuit of the transistor Tr1 and a direct current power source +V1; a diode D2 connected in parallel with an energizing coil of said relay RY1; and resistors R1 and R2 which are connected between the therefore, and right-channel output terminals L and R of the multiplex demodulator Next, description will be made on the action of the aforesaid example.

Figure 2:
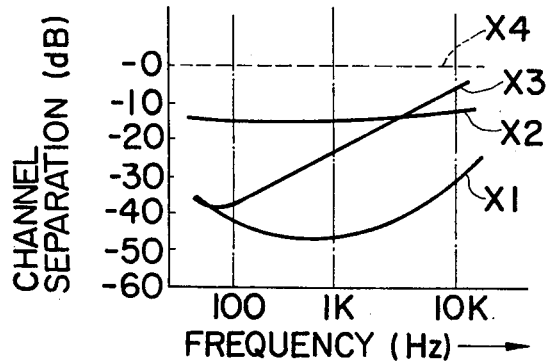
FIG. 2 is a chart showing the channel separating characteristics of the apparatus of FIG. 1.

Firstly, when the signal level of the FM stereo receiver A is at the predetermined level and accordingly when the signal receiving condition is in such a state that a good S/N ratio can be obtained, an intermediate frequency signal or an automatic gain control voltage (which will apply the same in the statement hereinafter made) of a sufficient level is applied to one terminal of the diode D1. This intermediate frequency signal is detected by a rectifier circuit which is composed of the diode D1 and the capacitor C1. The resulting direct current voltage of positive polarity which is thus detected causes the transistor Tr1 to be biased in the forward direction and this transistor Tr1 is rendered "on". Accordingly, an electric current flows through the energizing coil of the relay RY1 so that the contact of this relay opens. Thus, the output terminals between the right and left signal channels are opened relative to each other. As a result, stereo signals having such channel separation characteristic as shown by the curve X1 in FIG. 2 are generated at the terminals R and L of the right and left signal channels, without being affected in the least by noise-cancelling apparatus B of the FM stereo receiver A.

On the other hand, in case the level of the signals received by the FM stereo receiver A drops below a predetermined level and in case, accordingly, the signal receiving condition has plunged into a state wherein the S/N ratio is aggravated, the level of the intermediate frequency signal which is applied to one terminal of the diode D1 drops below a predetermined level. Accordingly, the base potential of the transistor Tr1 also drops, so that this transistor Tr1 is rendered "off".

Whereupon, the relay RY1 which has till then been energized is now de-energized, and the contact of this relay RY1 closes. Thus, the output terminals R and L of the right and left signal channels are connected to each other via the resistors R1 and R2. And, accordingly, the left and right channel signals are mutually blended with each other almost evenly throughout the entire audio frequency range. Whereby, the separation characteristic of the left and the right channels is weakened almost evenly throughout the entire range of audio frequency as shown by the curve X2 in FIG. 2, so that the noise components are cancelled by each other and the S/N ratio is greatly improved. Since the channel separation takes place substantially constantly throughout substantially the entire audio frequency range, the sound image is localized with a stability. Also, because the inverted phase components of the left and right channel signals are cancelled almost evenly throughout the entire range of audio frequency, there will not arise the inconveniences such as a decay in the higher frequency band.

In case it is intended to provide said noise-cancelling apparatus B so as to be operated manually, it is only necessary to replace said relay RY1 by a manual switching means. In such an instance, the received signal level detector B1 is not required.

The curve X3 in FIG. 2 indicates the channel separation characteristic in an instance wherein the resistors R1 and R2 are replaced by a capacitor. This channel separation characteristic corresponds to that which is obtained from a known noise-cancelling apparatus arranged so that only the higher frequency band components of the left and right channel signals are to be blended with each other.

Also, the curve X4 shown in FIG. 2 indicates the channel separation characteristic, i.e. the separation characteristic at the time of monoral reproduction, wherein the full amounts of the left and right channel signals are blended with each other.

Figure 3:
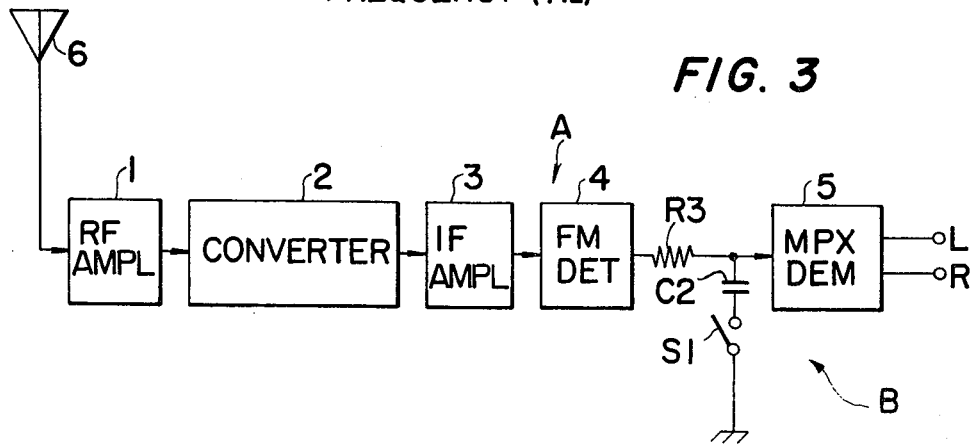
FIG. 3 is a block diagram showing a modified example of the noise-cancelling apparatus embodying the present invention.
Figure 4:
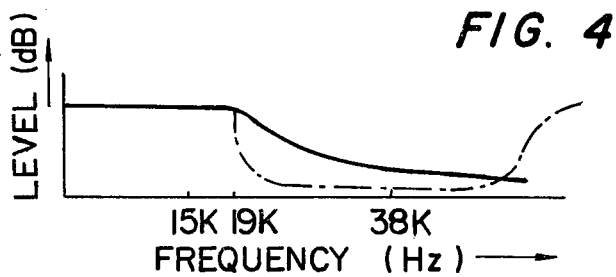
FIG. 4 is a chart showing the input frequency characteristics of the FM multiplex demodulator.

In FIG. 3, there is shown a modified example of the noise-cancelling appratus according to the present invention. The noise-cancelling appratus B of this example is arranged to be operative so that, by causing an decay attenuation of those frequency components exceeding the pilot signal (19 kHz) among the input signals, i.e. among the stereo composite signals, to the multiplex demodulator 5, the ability of this multiplex demodulator 5 to separate the left and the right channel signals is lowered, whereby to cancel the noise components relative to each other. A resistor R3 and a capacitor C2 which are connected between the FM detector 4 and the multiplex demodulator 5 of the FM stereo receiver A jointly constitute a high-cut filter whose cut-off frequency is about 19 kHz. This high-cut filter is placed into action when a switch S1 which is connected in series between the capacitor C2 and the ground is closed. In the event that the received signal level of the FM stereo receiver A has dropped below a predetermined level, the switch S1 is closed. Whereupon, those components exceeding the pilot signal frequency (19 kHz) and constituting the sub-channel signal among the input signals to the multiplex demodulator 5 are caused to be decreased to as shown by the solid line in FIG. 4. Thus, the separation between the left and the right channel signals becomes weakened. Or, in other words, the signals of the left and the right channels are blended mutually with each other, so that the noise components are cancelled with each other, and thus the S/N ratio is improved.

Figure 5:
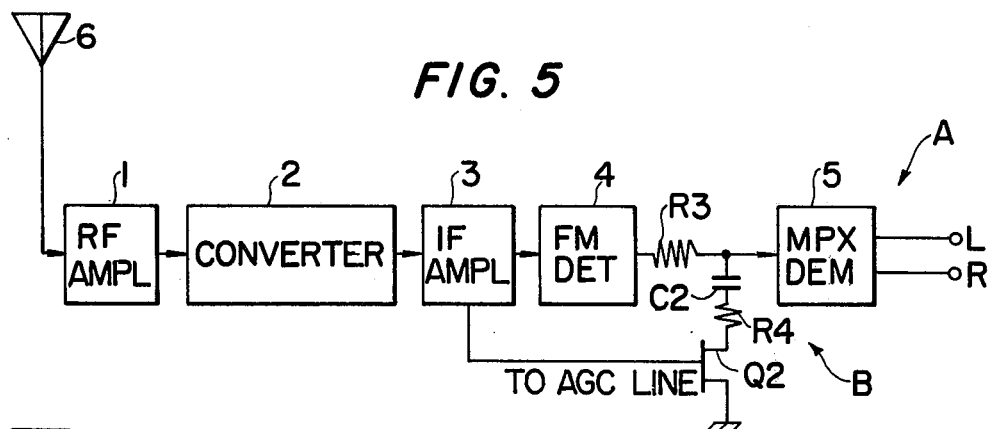
FIG. 5 through FIG. 7 are block diagrams showing further modified examples of the present invention, respectively.

FIG. 5 shows another modified arrangement in which the switch S1 in the example of FIG. 3 is replaced by a field effect transistor Q2 and in which means are provided so that an automatic gain control line voltage of the intermediate frequency amplifier circuit 3 is applied, as a control signal, to the gate electrode of said field effect transistor Q2. In other words, the field effect transistor Q2 serves as a received signal level detector and concurrently as an element of the blending circuit. When the level of the signal received by the FM stereo receiver A drops below a predetermined level, the field effect transistor Q2 is rendered conductive, and along with this those signal components exceeding the pilot signal frequency (19 kHz) and constituting the sub-channel signal among the input signals to the multiplex demodulator 5 are cause to be attenuated by the high-cut filter which is comprised of the resistors R3, R4 and the capacitor C2. Whereby, the channel separation is caused to become weaker, and as a result, the S/N ratio is improved.

Figure 6:
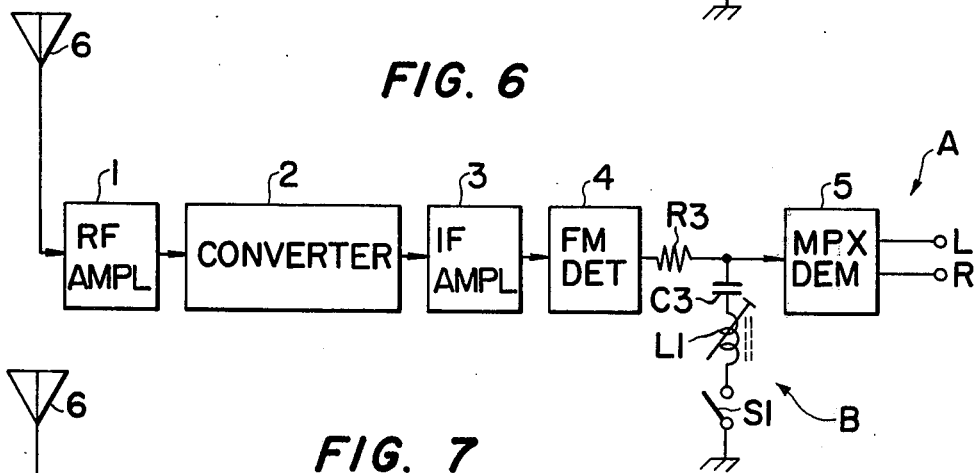
Figure 7:
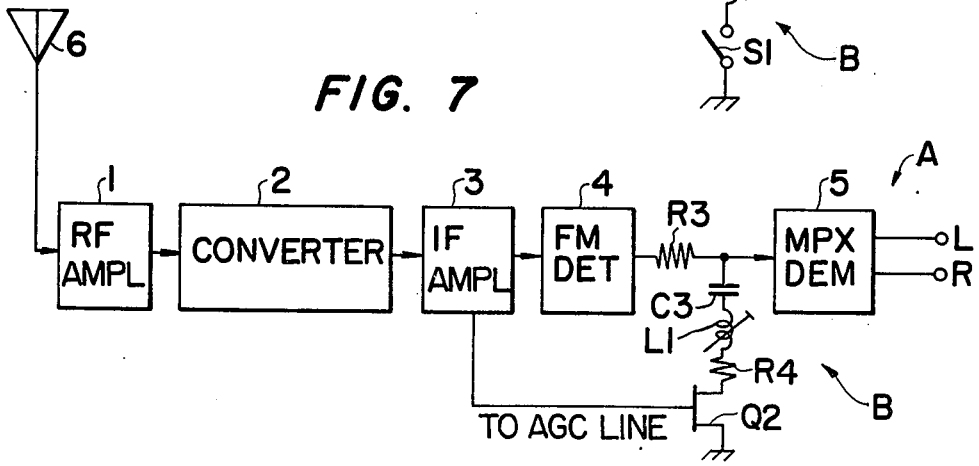

FIG. 6 and 7 show a further modified example in which the high-cut filters of FIGS. 3 and 5 are replaced by a band rejection filter which is composed of a capacitor C3 and an inductance L1. The series resonance frequency of said inductance L1 and said capacitor C3 is set at the sub-carrier signal frequency (38 kHz). By means of this band rejection filter, those components which are present in a certain frequency band centering around the sub-carrier freqeucny (38 kHz), i.e. the components constituting the subchannel portion, among the input signals to the multiplex demodulator 5 are caused to be decreased as shown by the chain line in FIG. 4. The action of this example is similar to that of the examples shown in FIGS. 3 and 5.

In the examples shown in FIGS. 3, 5, 6 and 7, those signals among the input signals of the multiplex demodulator 5 which are caused to be decreased are the components exceeding the pilot signal frequency (19 kHz) and constituting the sub-channel. Therefore, the channel separation becomes weakened, but the main channel components are not in the least affected. Thus, needless to say, there arises no inconvenience such that the higher frequency range decays.

FIG. 8 shows a block diagram of an example of the received signal level detector B1 employed in the noise-cancelling apparatus according to the present invention.

The received signal level detector B1 is capable of detecting the received signal, independently of the fluctuations in the gain of, for example, the radio frequency amplifier circuit 1 or the intermediate frequency amplifier circuit 3 of the FM stereo receiver. This received signal level detector B1 is arranged so that only the noise components are separated from the output of the FM detector 4 by a high pass filter 7; and that these separated noise components are rectified by a rectifier circuit 8 to obtain a direct current voltage corresponding to the level of the noise components; and that this direct current voltage is inverted by an inverter 9 and is delivered as a control signal. This control signal is fed to, for example, the base circuit of the transistor Tr1 shown in FIG. 1, or the gate electrode of the field effect transistor Q2 shown in FIGS. 5 and 7.

The noise signal is subjected to a limiting action by a limiter not shown which is provided in, for example, the final stage of the intermediate frequency amplifier circuit 3, and then it is inputted into the FM detector 4. However, the level of the noise components which appear in the output of the FM detector 4 is of such relationship as shown in FIG. 9A relative to the received signal level, and is not affected by, for example, the fluctuations of gain of the radio frequency amplifier circuit 1 or the intermediate frequency amplifier circuit 3. Accordingly, by setting the characteristic of the high pass filter 7 so as to let only the noise components pass therethrough as shown in FIG. 9B, the direct current output of the rectifier circuit 8 will become dependent on the level of the received signal. Thus, the relationship between the output level of the inverter 9 and the level of the received signal will become as shown in FIG. 9C. As stated above, according to the received signal level detector B1, the level of the received signal can be detected unerringly, regardless of such factors as the fluctuations of gain of the radio frequency amplifier circuit 1 or the intermediate frequency amplifier circuit 3. And, there is no need of making any particular adjustment for each FM stereo receiver. Also, it is possible to omit the inverter 9.

Figure 10:
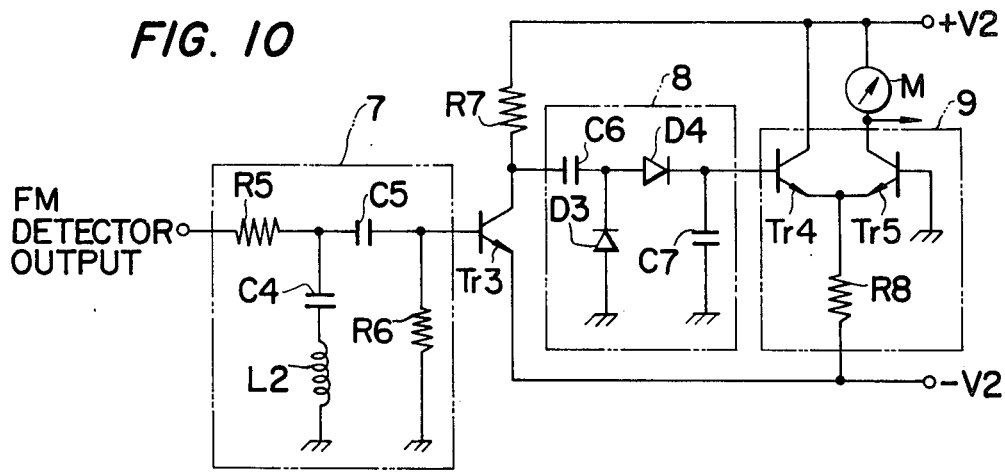
FIGS. 10 and 11 are electric circuit diagrams showing an example of a concrete arrangement of the received signal level detector employed in the noise-cancelling apparatus of the present invention.

FIG. 10 shows a concrete circuit of the aforesaid received signal level detector B1. The high pass filter 7 is composed of resistors R5 and R6, capacitors C4 and C5 and an inductance L2. The rectifier circuit 8 is provided in the form of the so-called double voltage rectifier circuit which is composed of diodes D3 and D4 and capacitors C6 and C7. The output of this high pass filter 7 is first amplified by an amplifier circuit of the grounded emitter type which is composed of a transistor Tr3 and a resistor R7, and thereafter it is fed to the rectifier circuit 8. The inverter 9 is a differential amplifier circuit which is composed of transistors Tr4 and Tr5 and a resistor R8. The output of the rectifier circuit 8 is inputted into the base circuit of one Tr4 of these two transistors. A received signal level indicating meter M which concurrently serves as a tuning indicator is connected to the collector circuit of the transistor Tr5. The control signal which is fed to the base circuit of the transistor Q1 shown in FIG. 1 or to the gate electrode of the field effect transistor Q2 shown in FIGS. 5 to 7 is derived from the collector circuit of the transistor Tr5. Symbols +V2 and −V2 represent direct current power sources.

When the level of the signal received is low, the level of the output of the high pass filter 7 is high, so that the output voltage of the rectifier circuit 8 is high. And, hardly any current flows through the meter M. At such a time, the collector circuit of the transistor Tr5 is of a high potential, and the field effect transistor Q2 (see FIGS. 5 and 7) is rendered conductive, so that the noise-cancelling action is exerted.

On the other hand, as the level of the signal received rises, the collector potential of the transistor Tr5 drops, and the deflection of the meter M increases. When the level of the signal received reaches the predetermined value or a higher value, the transistor Tr1 (see FIG. 1) which is connected to the collector circuit of the transistor Tr5 and the field effect transistor Q2 (see FIGS. 5 and 7) are rendered non-conductive, and as a result the noise-cancelling action ceases.

Figure 11:
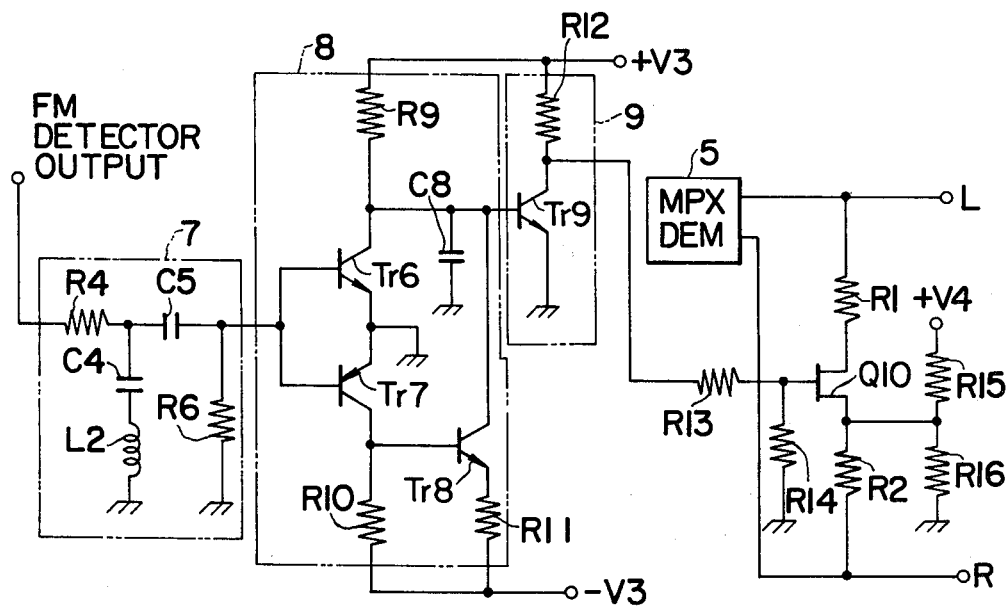

FIG. 11 shows another example of concrete circuit of the received signal level detector B1. The high pass filter 7 is same as that of the instance shown in FIG. 10. The rectifier circuit 8 is composed of transistors Tr6, Tr7 and Tr8, resistors R9, R10 and R11, and a capacitor C8. Among the output of the high pass filter 7, the positive half-wave is phase-inverted and amplified by the transistor Tr6, whereas the negative half-wave is in-phase amplified by the transistors Tr7 and Tr8, and the capacitor 8 is charged by the outputs of the two transistors Tr6 and Tr8. In other words, this rectifier circuit 8 is an all-wave rectifier circuit using transistors. The inverter 9 is an amplifier circuit of the grounded emitter type which is composed of a transistor Tr 9 and a resistor R12.

The output of the inverter 9 is applied to the gate electrode of the field effect transistor Q10 which is connected, as a series circuit with resistors R1 and R2, between the left and right channel signal terminals L and R of the multiplex demodulator 5. Symbols R13, R14, R15 and R16 represent resistors. Also, symbols +V3, −V3 and +V4 represent direct current power sources.

When the level of the signal received is low, the output voltage of the rectifier circuit 8, i.e. the voltage across the terminals of the capacitor C8, is at a low level, whereas the collector potential of the transistor Tr9 is high, and the field effect transistor Q10 is rendered conductive. As a result, the output terminals L and R of the left and the right signal channels are connected with each other via the resistors R1 and R2 and via the saturated resistor of the field effect transistor Q10. Whereupon, the left and the right channel signals are blended with each other almost evenly throughout the entire range of audio frequency. Thus, the S/N ratio is improved.

On the other hand, when the level of the signal received rises to the predetermined level or higher than that, the output of the rectifier circuit 8 increases, so that the transistor Tr9 is rendered conductive and its collector potential is rendered substantially to the ground level. Along therewith, the field effect transistor Q10 is rendered non-conductive, causing the connection between the left and the right channel signal output terminals L and R to be opened, and thus an ordinary receiving of FM broadcast signals is performed.

The received signal level detectors shown in FIGS. 8, 10 and 11 can be easily applied also to the muting circuit of FM stereo receivers.

We claim:

1. A noise-cancelling apparatus for use in an FM stereo receiver having an intermediate frequency amplifier circuit, an FM detector and a multiplex demodulator, said apparatus comprising:
   a filter inserted between said FM detector and said multiplex demodulator, and a switching element connected to the filter, said filter including:
   a. a resistor connected in series with a signal line between the FM detector and said multiplex demodulator, and
   b. a capacitor and an inductance connected in series with said switching element between the signal line and ground, the series connection of the capacitor and the inductance having a resonance frequency substantially equal to a sub-carrier signal frequency; and said switching element including: a field effect transistor having a gate electrode, said electrode being connected to an automatic gain control signal line of said intermediate frequency amplifier circuit.

* * * * *